US011335289B2

(12) United States Patent
Chen

(10) Patent No.: US 11,335,289 B2
(45) Date of Patent: May 17, 2022

(54) BLUR ELIMINATING CIRCUIT

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 10 days.

(21) Appl. No.: 16/610,198

(22) PCT Filed: Jun. 23, 2017

(86) PCT No.: PCT/CN2017/089665
§ 371 (c)(1),
(2) Date: Nov. 1, 2019

(87) PCT Pub. No.: WO2018/201592
PCT Pub. Date: Nov. 8, 2018

(65) Prior Publication Data
US 2020/0372871 A1 Nov. 26, 2020

(30) Foreign Application Priority Data
May 5, 2017 (CN) .......................... 201710313263.1

(51) Int. Cl.
G09G 3/36 (2006.01)
G02F 1/1368 (2006.01)

(52) U.S. Cl.
CPC ......... *G09G 3/3648* (2013.01); *G02F 1/1368* (2013.01); *G09G 2320/0257* (2013.01); *G09G 2330/02* (2013.01)

(58) Field of Classification Search
CPC ......... G09G 3/3648; G09G 2320/0257; G09G 2330/02; G02F 1/1368
See application file for complete search history.

(56) References Cited

U.S. PATENT DOCUMENTS

2002/0041279 A1* 4/2002 Chou .................... G09G 3/3611
323/284
2005/0168491 A1* 8/2005 Takahara ............. G09G 3/3283
345/690

(Continued)

FOREIGN PATENT DOCUMENTS

CN 204558001 U 8/2015
JP 2002175063 A 6/2002

*Primary Examiner* — Patrick N Edouard
*Assistant Examiner* — Eboni N Giles
(74) *Attorney, Agent, or Firm* — Muncy, Geissler, Olds & Lowe, P.C.

(57) ABSTRACT

A blur eliminating circuit and a display device are provided. The blur eliminating circuit includes a detection unit and a control unit. The detection unit generates a control signal after detecting and determining that the display device is shut down. The control unit controls a gate low voltage level outputted from a gate driving unit of the display device to be a predetermined voltage level according to the control signal, and thus turns on an active switch of the display device, thereby speeding up a discharging of a liquid crystal capacitor and a storage capacitor of the display device, and eliminating a shutdown blur phenomenon.

11 Claims, 3 Drawing Sheets

(56) References Cited

U.S. PATENT DOCUMENTS

| | | | | |
|---|---|---|---|---|
| 2014/0085289 A1* | 3/2014 | Liang | ............... | G09G 3/3611 |
| | | | | 345/212 |
| 2017/0345372 A1* | 11/2017 | Xiao | ............... | G09G 3/3614 |
| 2018/0240414 A1* | 8/2018 | Yang | ............... | G09G 3/3648 |

* cited by examiner

BLUR ELIMINATING CIRCUIT

BACKGROUND

Technology Field

This disclosure relates to the technical field of a display, and more particularly to a blur eliminating circuit and a display device.

Description of Related Art

At present, a liquid crystal display is the most popular display, and it is used in many electronic apparatuses, such as computers, mobile phones, televisions and the likes. However, due to the working mechanisms of the liquid crystal capacitor and the storage capacitor of the liquid crystal panel, the capacitor of the liquid crystal panel cannot be effectively discharged when the liquid crystal display is shut down, and a residual image is left on the display screen to cause the shutdown blur issue.

In order to solve the shutdown blur issue, several blur eliminating circuits are provided. One common blur eliminating circuit utilizes an output ALL-ON control (XAO, signal forced to be pulled up, also known as XON) signal of a gate driving unit. The XAO signal has a high voltage level upon the normal work, and the gate driving unit successively turns on gates of thin film transistors (TFTs) to perform the normal display. Upon shutdown, the XAO signal has a low voltage level, and the gate driving unit turns on the gates of the TFTs to speed up the discharge of the capacitor of the liquid crystal display and thus to eliminate the shutdown blur. However, the existing gate driving circuit having the XAO signal is more complicated, thereby causing the higher cost of the liquid crystal display.

SUMMARY

Embodiments of this disclosure provide a blur eliminating circuit and a display device for the purpose of eliminating a shutdown blur phenomenon of the display device while decreasing the cost of the display device.

In a first aspect, a blur eliminating circuit applied to a display device is provided. The blur eliminating circuit comprises a detection unit, a control unit and an active switch. The detection unit is configured to detect whether the display device is shut down, and generates a control signal after determining that the display device is shut down. The control unit is connected to the detection unit, and controls a gate driving unit of the display device according to the control signal so as to control a gate low voltage level outputted from the gate driving unit to be a predetermined voltage level. The predetermined voltage level is configured to turn on the active switch of the display device, and the active switch turns on to speed up the discharging of a liquid crystal capacitor and a storage capacitor of the display device after the display device is shut down.

In the blur eliminating circuit of this disclosure, the detection unit comprises a comparator and a first capacitor. The comparator has a non-inverting terminal receiving a first predetermined voltage level, an inverting terminal receiving a second predetermined voltage level, and an output terminal connected to the control unit. The non-inverting terminal is grounded through the first capacitor. When the display device works normally, the first predetermined voltage level is equal to the second predetermined voltage level, so that the comparator outputs the control signal with a low voltage level. When the display device is shut down, the first predetermined voltage level is regulated, by the first capacitor, to be higher than the second predetermined voltage level, so that the comparator outputs the control signal with a high voltage level.

In the blur eliminating circuit of this disclosure, the control unit comprises a first field effect transistor, a second field effect transistor, a first resistor and a second capacitor. The first field effect transistor has a gate connected to the output terminal of the comparator, a source connected to a gate of the second field effect transistor and grounded through the first resistor, and a drain receiving the second predetermined voltage level. The second field effect transistor has a source receiving the predetermined voltage level and grounded through the second capacitor, and a drain connected to the gate driving unit.

In the blur eliminating circuit of this disclosure, the blur eliminating circuit may be integrated in the gate driving unit.

In the blur eliminating circuit of this disclosure, the first capacitor and the second capacitor have capacitances ranging from 5 to 15 µF.

In the blur eliminating circuit of this disclosure, voltage withstanding values of the first capacitor and the second capacitor range from 15 to 25V.

In the blur eliminating circuit of this disclosure, operation voltages of the first field effect transistor and the second field effect transistor range from 30 to 40V.

In a second aspect, the disclosure also provides a display device, which comprises a display panel and a blur eliminating circuit. The blur eliminating circuit is disposed on the display panel, and the blur eliminating circuit comprises a detection unit, a control unit and an active switch. The detection unit is configured to detect whether the display device is shut down, and generates a control signal after determining that the display device is shut down. The control unit is connected to the detection unit, and controls a gate driving unit of the display device according to the control signal so as to control a gate low voltage level outputted from the gate driving unit to be a predetermined voltage level. The predetermined voltage level is configured to turn on the active switch of the display device. The active switch turns on to speed up the discharging of a liquid crystal capacitor and a storage capacitor of the display device after the display device is shut down.

In the display device of this disclosure, the detection unit comprises a comparator and a first capacitor. The comparator has a non-inverting terminal receiving a first predetermined voltage level, an inverting terminal receiving a second predetermined voltage level, and an output terminal connected to the control unit. The non-inverting terminal is grounded through the first capacitor. When the display device works normally, the first predetermined voltage level is equal to the second predetermined voltage level, so that the comparator outputs the control signal with a low voltage level. When the display device is shut down, the first predetermined voltage level is regulated, by the first capacitor, to be higher than the second predetermined voltage level, so that the comparator outputs the control signal with a high voltage level.

In the display device of this disclosure, the control unit comprises a first field effect transistor, a second field effect transistor, a first resistor and a second capacitor. The first field effect transistor has a gate connected to the output terminal of the comparator, a source connected to a gate of the second field effect transistor and grounded through the first resistor, and a drain receiving the second predetermined voltage level. The second field effect transistor has a source receiving the predetermined voltage level and grounded through the second capacitor, and a drain connected to the gate driving unit.

A blur eliminating circuit in an embodiment of this disclosure comprises a detection unit and a control unit, the detection unit is connected to the control unit, and the control unit is connected to a gate driving unit of the display device. The detection unit is configured to generate a control signal after detecting and determining that the display device is shut down. The control unit is configured to control the gate driving unit of the display device upon receiving the control signal, so that a gate low voltage level outputted from the gate driving unit is controlled to be a predetermined voltage level for turning on an active switch of the display device. For example, the predetermined voltage level has the high voltage level for turning on all the active switches of the display device. When the display device is shut down, the gate low voltage level has the high voltage level and the active switch is normally open, thereby speeding up the discharging of a liquid crystal capacitor and a storage capacitor of the display device, and eliminating a shutdown blur phenomenon. Meanwhile, the detection unit and the control unit may be implemented by a comparator and a field effect transistor. Thus, compared with the conventional gate driving circuit having the XAO signal, the cost of the display device of this disclosure is lowered.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
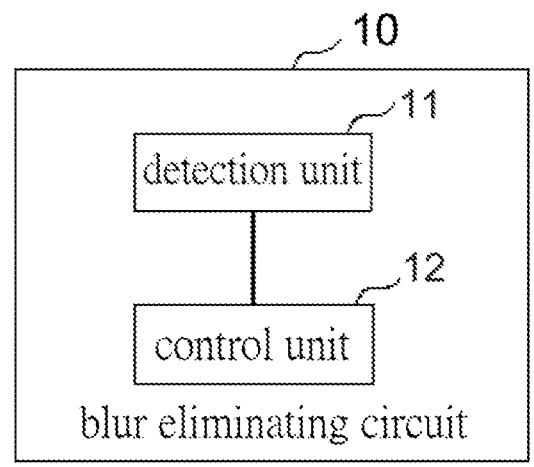
FIG. 1 is a schematic view showing a blur eliminating circuit provided by an embodiment of this disclosure.

FIG. 1 is a schematic view showing a blur eliminating circuit provided by an embodiment of this disclosure. Referring to FIG. 1, the blur circuit may be integrated within a gate driving unit of the display device, and is for eliminating some residual images (i.e., the shutdown blur) when the display device is shut down.

The shutdown blur is caused by charges accumulated on the liquid crystal capacitor and the storage capacitor after the display device has displayed images for a long time. When the display device is powered off, these accumulated charges keep the corresponding pixels at different gray scales, and some image blurs are thus remained on the display device. Herein, the image blur is the shutdown blur.

Referring to FIG. 1, a blur eliminating circuit 10 comprises a detection unit 11 and a control unit 12 connected to the detection unit 11.

The detection unit 11 is configured to generate a control signal after detecting a shutdown of the display device. The control unit 12 is configured to control a gate driving unit of the display device according to the control signal so that a VGL (V gate low or gate low voltage level) outputted from the gate driving unit is controlled to be a third predetermined voltage level. The third predetermined voltage level is configured to turn on an active switch of the display device, and the active switch is a thin film transistor, for example. Specifically, the third predetermined voltage level may be a high voltage level capable of turning on the thin film transistor of the display device.

When the display device is shut down, the control unit 12 controls the gate low voltage level to be the high voltage level. The high voltage level signal enables all the active switches (thin film transistors) of the display device to be normally open, thereby speeding up the discharging of the liquid crystal capacitor and the storage capacitor of the display device, and eliminating the shutdown blur phenomenon. The detection unit 11 and the control unit 12 may be implemented by simple electronic components. Thus, compared with the conventional gate driving circuit having the XAO signal, the disclosure can not only eliminate the shutdown blur phenomenon, but also lower the cost of the display device.

Figure 2:
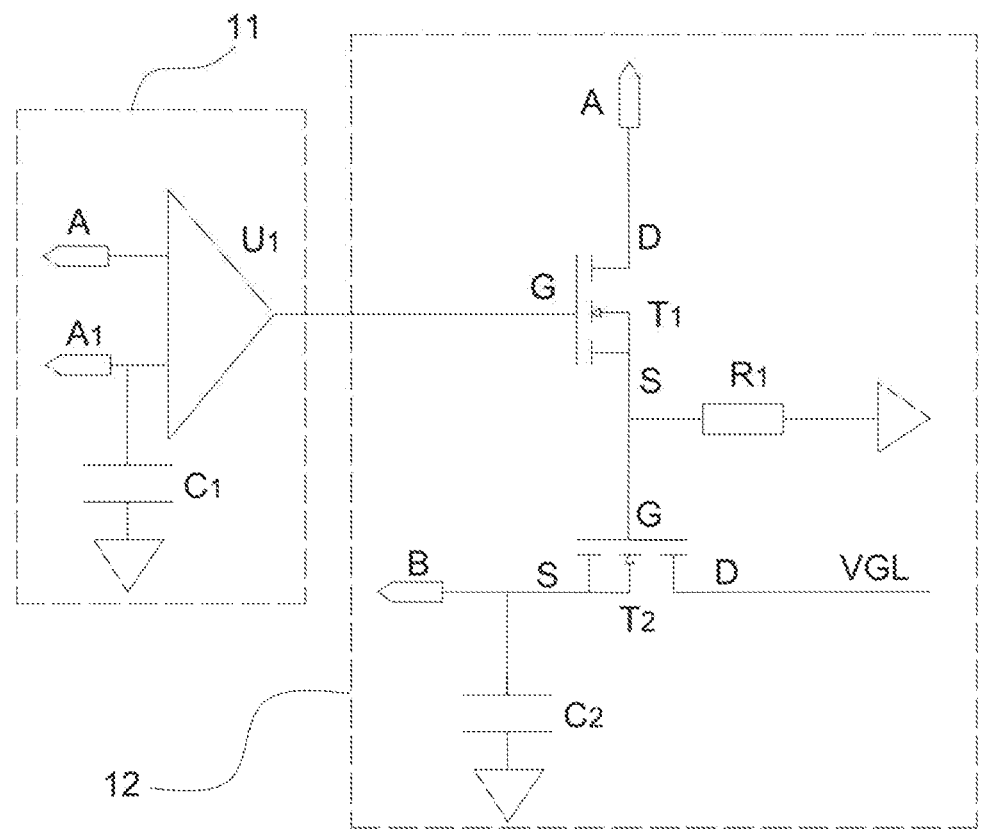
FIG. 2 is another schematic view showing the blur eliminating circuit provided by the embodiment of this disclosure.

FIG. 2 is another schematic view showing the blur eliminating circuit provided by the embodiment of this disclosure. Referring to FIG. 2, the detection unit 11 comprises a comparator U1 and a first capacitor C1. The comparator U1 has a non-inverting terminal receiving a first predetermined voltage level A1 and being grounded through the first capacitor C1, an inverting terminal for receiving a second predetermined voltage level A, and an output terminal connected to the control unit 12.

The control unit 12 comprises a first field effect transistor T1, a second field effect transistor T2, a first resistor R1 and a second capacitor C2. In this embodiment, each of the first field effect transistor T1 and the second field effect transistor T2 is a metal oxide semiconductor (MOS).

The first field effect transistor T1 has a gate G connected to the output terminal of the comparator U1, a source S connected to a gate G of the second field effect transistor T2 and grounded through the first resistor R1, and a drain D for receiving the second predetermined voltage level A.

The second field effect transistor T2 has a source S for receiving the third predetermined voltage level B and being grounded through the second capacitor C2, and a drain D connected to the gate driving unit and specifically connected to a GOA circuit of the display device.

When the display device works normally, the first predetermined voltage level A1 is equal to the second predetermined voltage level A so that the comparator U1 outputs the control signal with the low voltage level. When the display device is shut down, the first predetermined voltage level A1 is greater than the second predetermined voltage level A under the storage and regulation of the first capacitor C1, so that the comparator U1 outputs the control signal with the high voltage level.

When the display device normally works and the comparator U1 outputs the control signal with the low voltage level, the gate of the first field effect transistor T1 has the low voltage level and the source grounded through the first resistor also has the low voltage level. Thus, the first field effect transistor T1 turns off. The gate of the second field effect transistor T2 also has the low voltage level, and the second field effect transistor T2 also turns off. Thus, the blur eliminating circuit does not work on the gate low voltage level signal of the gate driving unit of the display device, and does not affect the normal work of the display device.

When the display device is shut down, the comparator U1 outputs the control signal with the high voltage level, the gate of the first field effect transistor T1 has the high voltage level, and the source thereof has the low voltage level. Thus, the first field effect transistor T1 turns on. The gate of the second field effect transistor T2 has the second predetermined voltage level A. Herein, the second predetermined voltage level A is set to be higher than the third predetermined voltage level B in advance. Thus, the second field effect transistor T2 also turns on to make the output gate low voltage level of the gate driving unit become the third predetermined voltage level B. The third predetermined voltage level B is configured to turn on all thin film transistors of the display device. Thus, when the display device is shut down, the discharging of the liquid crystal capacitor and the storage capacitor of the display device is speeded up, and the shutdown blur phenomenon is eliminated.

Figure 3:
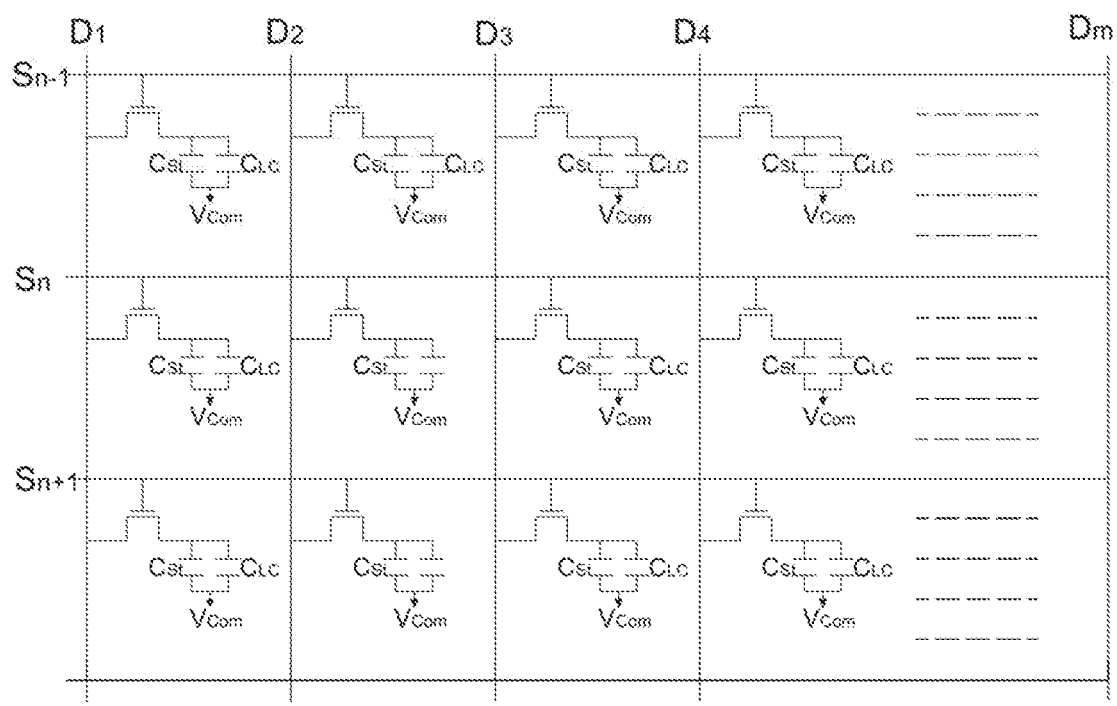
FIG. 3 is a schematic view showing an array circuit of a display device provided by an embodiment of this disclosure.

Specifically, referring to FIG. 3, the display device comprises multiple scan lines S and data lines D, and the scan lines S and the data lines D define multiple pixel units. Each pixel unit comprises a liquid crystal capacitor $C_{LC}$ and a storage capacitor $C_{St}$ formed by a pixel electrode and a common electrode. Each pixel unit has one thin film transistor. The thin film transistor has a gate connected to the scan line, and a source connected to the data line. The scan line is connected to the gate driving unit, and the gate driving unit outputs a gate pulse signal for turning on the thin film transistors row by row.

When the display device is shut down, the blur eliminating circuit controls the output gate low voltage level of the gate driving unit to be the third predetermined voltage level for turning on all the thin film transistors (TFTs) of the display device. Upon shutdown, all the TFTs of the array substrate of the display device turn on to speed up the discharging of the liquid crystal capacitor CLc and the storage capacitor Cst in each pixel unit, thereby eliminating the blur problem caused by the shutdown.

In the embodiment of this disclosure, the first capacitor C1 and the second capacitor C2 have capacitances ranging from 5 to 15 μF. The first capacitor C1 and the second capacitor C2 have voltage withstanding values ranging from 15 to 25V.

In the embodiment of this disclosure, the first field effect transistor T1 and the second field effect transistor T2 have operation voltages ranging from 30 to 40V.

In the embodiment of this disclosure, the resistance of the first resistor is 4.7 KΩ.

In summary, the blur eliminating circuit controls the gate low voltage level to be the high voltage level when the display device is shut down, so that the thin film transistor turns on to speed up the discharging of the liquid crystal capacitor and the storage capacitor of the display device, and eliminate the shutdown blur phenomenon. Meanwhile, the detection unit and the control unit can be implemented by the comparator and the field effect transistor. Thus, compared with the conventional gate driving circuit having the XAO signal, the cost of the display device is lowered.

Figure 4:
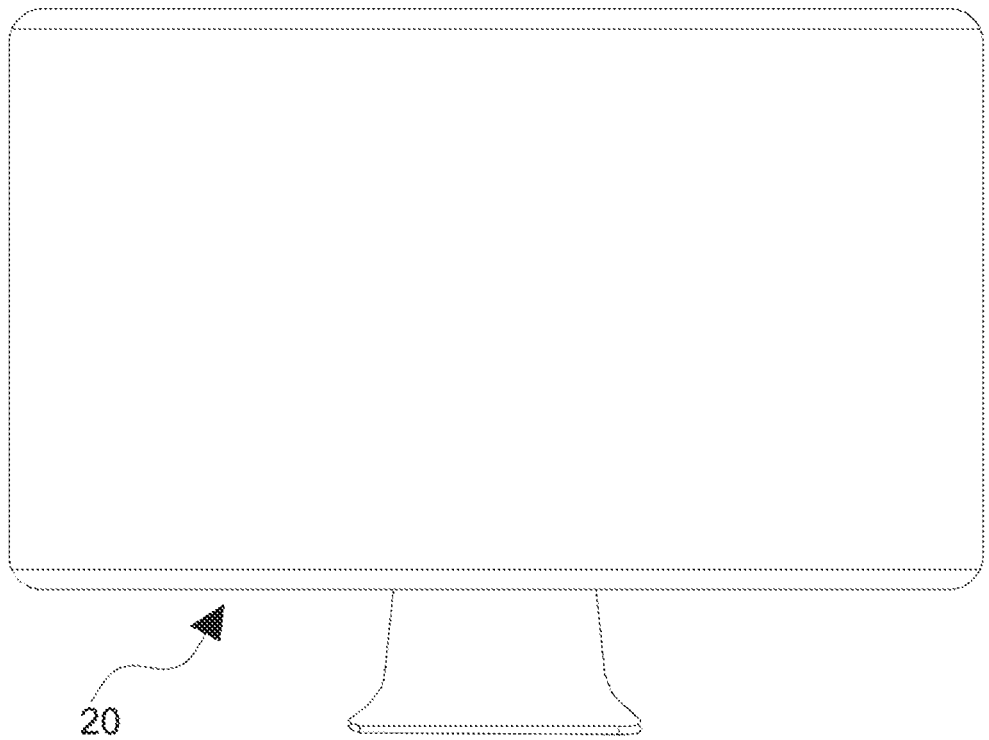
FIG. 4 is a schematic view showing a structure of a display device provided by an embodiment of this disclosure.

FIG. 4 is a schematic view showing a structure of a display device provided by an embodiment of this disclosure. Referring to FIG. 4, a display device 20 adopts the blur eliminating circuit 10 of the above-mentioned embodiment. For the sake of simplicity of the specification, detailed descriptions thereof will be omitted. Specifically, the display device 20 comprises a display panel, and the blur eliminating circuit is disposed on the display panel. The blur eliminating circuit can be integrated within the gate driving unit of the display panel to eliminate the shutdown blur problem caused by the shutdown of the display device 20.

In some embodiments, the display panel may be, for example, a twisted nematic liquid crystal display panel, an in-plane switching type liquid crystal display panel, a multi-domain vertical alignment liquid crystal display panel, an OLED display panel, a QLED display panel or other display panels.

The display device 20 is a liquid crystal display device, and may be specifically a thin film transistor liquid crystal display. In FIG. 4, the display device 20 is a computer display. It is understandable that, in other embodiments, the display device 20 may also be a display of another electronic apparatus, such as a tablet computer, a mobile phone or the likes. The shape of the display device 20 in FIG. 4 does not intend to restrict the specific structure of the display device in this disclosure.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A blur eliminating circuit applied to a display device, wherein the blur eliminating circuit comprises:
    a detection unit configured to detect whether the display device is shut down, and generating a control signal after determining that the display device is shut down;
    a control unit connected to the detection unit and controlling a gate driving unit of the display device according to the control signal so as to control a gate low voltage level outputted from the gate driving unit to be a high voltage level, wherein the high voltage level is configured to turn on a plurality of active switches of the display device for speeding up discharging of a plurality of liquid crystal capacitors and a plurality of storage capacitors of the display device after the display device is shut down,
    wherein the plurality of active switches are thin film transistors,
    wherein the detection unit comprises a comparator and a first capacitor, a non-inverting terminal of the comparator receives a first predetermined voltage level and is grounded through the first capacitor, an inverting terminal of the comparator receives a second predetermined voltage level, and an output terminal of the comparator is connected to the control unit,
    wherein when the display device works normally, the first predetermined voltage level is equal to the second predetermined voltage level, so that the comparator outputs the control signal with a low voltage level; and when the display device is shut down, the first predetermined voltage level is regulated, by the first capacitor, to be higher than the second predetermined voltage level, so that the comparator outputs the control signal with a high voltage level,
    wherein the control unit comprises a first field effect transistor, a second field effect transistor, a first resistor and a second capacitor, the first field effect transistor has a gate connected to the output terminal of the comparator, a source connected to a gate of the second field effect transistor and grounded through the first resistor, and a drain receiving the second predetermined voltage level, the second field effect transistor has a source receiving a third predetermined voltage level which is the gate low voltage level outputted from the gate driving unit, which is lower than the second predetermined voltage level when the display device is shut down, and which is configured to turn on all of the plurality of thin film transistors of the display device and being grounded through the second capacitor, and a drain connected to the gate driving unit.

2. A blur eliminating circuit applied to a display device, wherein the blur eliminating circuit comprises:
a detection unit configured to detecting whether the display device is shut down, and generating a control signal after determining that the display device is shut down;
a control unit connected to the detection unit and controlling a gate driving unit of the display device according to the control signal so as to control a gate low voltage level outputted from the gate driving unit to be a predetermined voltage level, wherein the predetermined voltage level is configured to turn on a plurality of active switches of the display device for speeding up discharging of a plurality of liquid crystal capacitors and a plurality of storage capacitors of the display device after the display device is shut down, wherein the plurality of active switches are thin film transistors,
wherein the detection unit comprises a comparator and a first capacitor, a non-inverting terminal of the comparator receives a first predetermined voltage level and is grounded through the first capacitor, an inverting terminal of the comparator receives a second predetermined voltage level, and an output terminal of the comparator is connected to the control unit,
wherein when the display device works normally, the first predetermined voltage level is equal to the second predetermined voltage level, so that the comparator outputs the control signal with a low voltage level; and when the display device is shut down, the first predetermined voltage level is regulated, by the first capacitor, to be higher than the second predetermined voltage level, so that the comparator outputs the control signal with a high voltage level,
wherein the control unit comprises a first field effect transistor, a second field effect transistor, a first resistor and a second capacitor, the first field effect transistor has a gate connected to the output terminal of the comparator, a source connected to a gate of the second field effect transistor and grounded through the first resistor, and a drain receiving the second predetermined voltage level, the second field effect transistor has a source receiving a third predetermined voltage level which is the gate low voltage level outputted from the gate driving unit, which is lower than the second predetermined voltage level when the display device is shut down, and which is configured to turn on all of the plurality of thin film transistors of the display device and being grounded through the second capacitor, and a drain connected to the gate driving unit.

3. The blur eliminating circuit according to claim 2, wherein the blur eliminating circuit is integrated in the gate driving unit.

4. The blur eliminating circuit according to claim 2, wherein the first capacitor and the second capacitor have capacitances ranging from 5 to 15 µF.

5. The blur eliminating circuit according to claim 2, wherein voltage withstanding values of the first capacitor and the second capacitor range from 15 to 25V.

6. The blur eliminating circuit according to claim 2, wherein operation voltages of the first field effect transistor and the second field effect transistor range from 30 to 40V.

7. A display device, comprising:
a display panel; and
a blur eliminating circuit disposed on the display panel and comprising:
a detection unit configured to detect whether the display device is shut down, and generating a control signal after determining that the display device is shut down,
a control unit connected to the detection unit and controlling a gate driving unit of the display device according to the control signal so as to control a gate low voltage level outputted from the gate driving unit to be a predetermined voltage level, wherein the predetermined voltage level is configured to turn on a plurality of active switches of the display device for speeding up discharging of a plurality of liquid crystal capacitors and a plurality of storage capacitors of the display device after the display device is shut down, wherein the plurality of active switches are a thin film transistor,
wherein the detection unit comprises a comparator and a first capacitor, a non-inverting terminal of the comparator receives a first predetermined voltage level and is grounded through the first capacitor, an inverting terminal of the comparator receives a second predetermined voltage level, and an output terminal of the comparator is connected to the control unit,
wherein when the display device works normally, the first predetermined voltage level is equal to the second predetermined voltage level, so that the comparator outputs the control signal with a low voltage level; and when the display device is shut down, the first predetermined voltage level is regulated, by the first capacitor, to be higher than the second predetermined voltage level, so that the comparator outputs the control signal with a high voltage level,
wherein the control unit comprises a first field effect transistor, a second field effect transistor, a first resistor and a second capacitor, the first field effect transistor has a gate connected to the output terminal of the comparator, a source connected to a gate of the second field effect transistor and grounded through the first resistor, and a drain receiving the second predetermined voltage level, the second field effect transistor has a source receiving a third predetermined voltage level which is the gate low voltage level outputted from the gate driving unit, which is lower than the second predetermined voltage level when the display device is shut down, and which is configured to turn on all of the plurality of thin film transistors of the display device and being grounded through the second capacitor, and a drain connected to the gate driving unit.

8. The display device according to claim 7, wherein the blur eliminating circuit is integrated in the gate driving unit.

9. The display device according to claim 7, wherein the first capacitor and the second capacitor have capacitances ranging from 5 to 15 µF.

10. The display device according to claim 7, wherein voltage withstanding values of the first capacitor and the second capacitor range from 15 to 25V.

11. The display device according to claim 7, wherein operation voltages of the first field effect transistor and the second field effect transistor range from 30 to 40V.

\* \* \* \* \*